United States Patent
Goldman et al.

(10) Patent No.: US 6,374,352 B1
(45) Date of Patent: Apr. 16, 2002

(54) TEMPORARY CONFIGURATION WITH FALL-BACK

(75) Inventors: Tomasz J. Goldman, Hellerup; Ol Krag Hansen, Herlufmagle, both of (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/271,803

(22) Filed: Mar. 18, 1999

Related U.S. Application Data

(60) Provisional application No. 60/097,913, filed on Aug. 26, 1998.

(51) Int. Cl.[7] ............................................. G06F 9/445
(52) U.S. Cl. ................................................... 713/1
(58) Field of Search ..................... 713/1, 100

(56) References Cited

U.S. PATENT DOCUMENTS

| | | | |
|---|---|---|---|
| 4,321,667 A | 3/1982 | Robbins et al. | 364/200 |
| 4,755,995 A | 7/1988 | Anderson et al. | 371/9 |
| 4,788,637 A | 11/1988 | Tamaru | 364/200 |
| 4,797,885 A | 1/1989 | Orimo et al. | 371/19 |
| 5,008,814 A | 4/1991 | Mathur | |
| 5,155,837 A | 10/1992 | Liu et al. | 395/500 |
| 5,546,595 A * | 8/1996 | Morman et al. | 713/100 X |
| 5,768,568 A * | 6/1998 | Inoi et al. | 713/1 X |
| 6,175,417 B1 * | 1/2001 | Merrill | 713/100 X |

* cited by examiner

*Primary Examiner*—Thomas M. Heckler
(74) *Attorney, Agent, or Firm*—Fish & Richardson P.C.

(57) ABSTRACT

Mechanisms initializing a network device having a current configuration, a processor and a configuration storage, and testing a test configuration whereby the current configuration can be reused if the test configuration fails to initialize and operate the network device properly. The mechanisms store the current configuration in the configuration storage, detect a plurality of configuration records associated with the test configuration data, detect the test configuration data, determine whether the test configuration data is to be used during an initialization of the network device and storing the test and current configuration records in non-volatile memory.

15 Claims, 4 Drawing Sheets

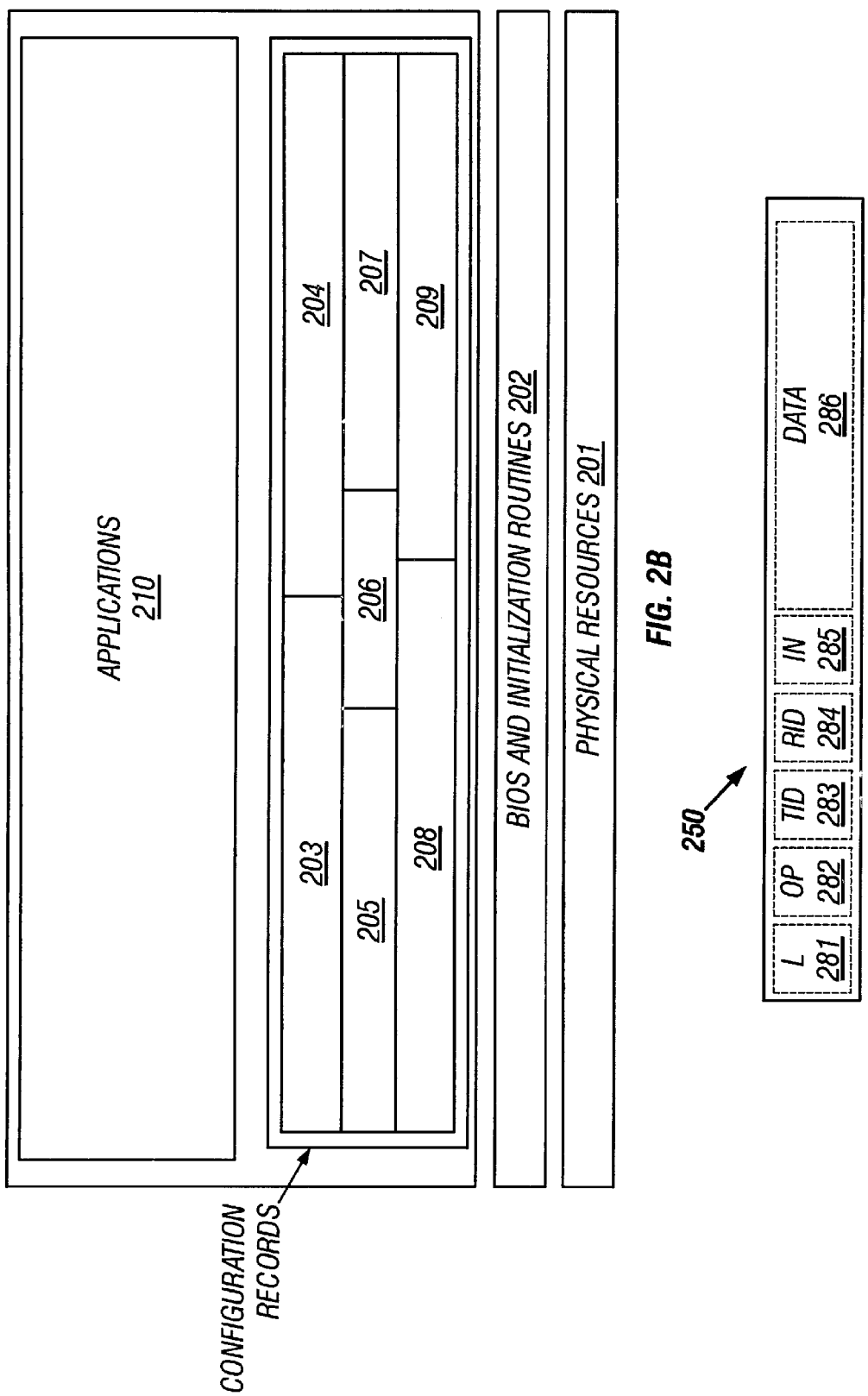

TEMPORARY CONFIGURATION WITH FALL-BACK

Priority based on provisional patent application, Serial No. 60/097,913 filed Aug. 26, 1998 entitled, "Using Temporary Configuration with Fall-Back Mechanism" is claimed.

BACKGROUND OF THE INVENTION

In computer systems, and devices having an embedded processor and software, it may be necessary to update software or modify configuration parameters to fix defects or alter device operation. Users may be reluctant to try a new software configuration because it may not work in a satisfactory manner or may completely fail to work, resulting in device unavailability or decreased reliability.

When updating a router, bridge, and other system having a software-configured processor, a backup copy of the old configuration may be stored on a separate computer before establishing a new configuration. If the new configuration fails, the old configuration parameters can be copied from that separate computer to the embedded system. This copying is time consuming and creates the possibility that there may be new user errors in the reloading of the old software and reconfiguration of the system. In addition, this solution may require that the embedded system with the new configuration be at least partially working to restore the old configuration.

SUMMARY OF THE INVENTION

In general, the invention provides improved methods to configure embedded devices. In one aspect, the invention includes a system capable of storing both a current operable configuration of the software and a new configuration of the software. Implementations may store configuration data in one or more configuration records. The configuration records may store the status of multiple available configurations. An operating configuration may be selected by altering the configuration record and reinitializing the system.

The present invention relates to computer network systems and in particular to a method for initializing a system having a processor and a configuration storage. Implementations may allow changes to be made to an existing configuration of the network system, test the new configuration and optionally reject or accept the new configuration. There is also provided a fall-back mechanism which reboots the embedded system using the old configuration in case the new configuration fails to function properly.

In general, in one aspect, the invention includes a computer configuration method. The method includes storing a first sequence of configuration records, storing an escape record, and establishing device configuration parameters. The escape record may include data designating the sequence of records as a test sequence. An escape record may be stored in non-volatile memory.

Implementations may include one or more of the following features. Escape record data may be altered to indicate an attempt to configure the device using configuration data in the test sequence. Device parameters may be set in accordance with configuration data in a first configuration record. The device may be reinitialized and during reinitialization may detect an escape record designating a sequence of configuration records as a test sequence. Detected escape records may be altered to designate the first sequence as a rejected sequence. Receiving data indicating whether an operational device configuration is to be accepted or rejected, and selectively altering escape record data to indicate whether the first sequence has been accepted or rejected.

In general, in another aspect, the invention includes a computer program residing on a computer-readable medium. The program includes instructions for causing a computer to store a first sequence of escape records, store an escape record, and establish device configuration parameters in accordance with the configuration data in the test sequence. Each configuration record includes device configuration data. The escape record includes data designating the first sequence as a test sequence.

In general, in another aspect the invention includes a processor-based apparatus including a processor, a configurable peripheral device operationally coupled to the processor, and a memory operationally coupled to the processor. The memory stores instructions causing the processor to store a first sequence of configuration records in a second memory, each record including device configuration data, store an escape record in the second memory, the escape record including data designating the first sequence as a test sequence, configure the peripheral device in accordance with the configuration data in the test sequence. Implementations may include one or more of the following features. The apparatus may include a hard disk, RAM, FLASH, and other memory.

Other features and advantages will be readily apparent from the following description, the accompanying drawings, and the claims.

BRIEF DESCRIPTION OF THE DRAWINGS

FIG. 2B illustrates a region in memory.

FIG. 2C illustrates a configuration record.

DETAILED DESCRIPTION

Figure 1:
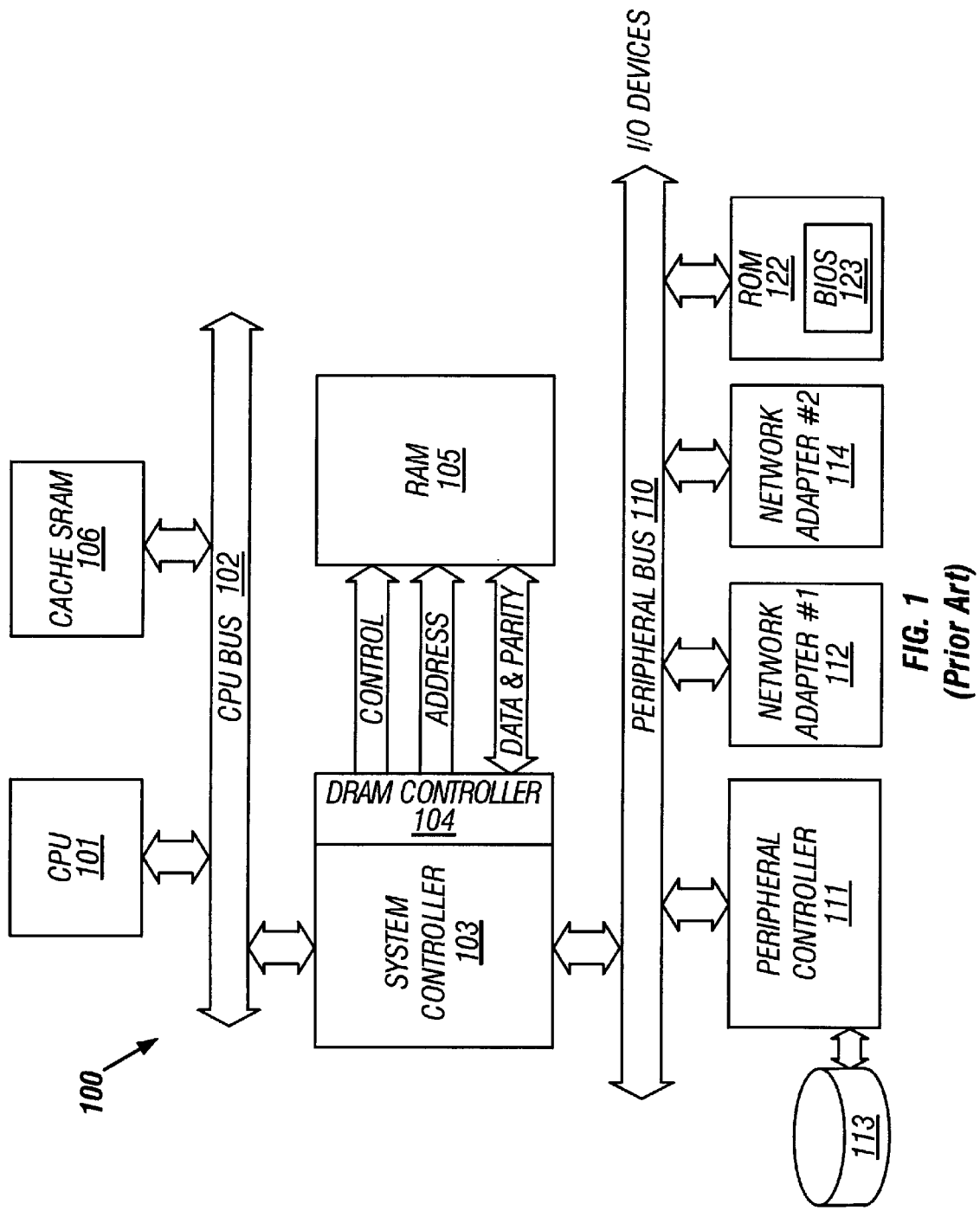
FIG. 1 illustrates a computer system.

FIG. 1 depicts physical resources of an exemplary network device 100. The device 100 has a central processor 101 connected to a processor host bus 102 over which it provides data, address and control signals. The processors 101 may be any conventional general purpose single- or multi-chip processor such as Pentium processor, a Pentium Pro processor, Pentium II processor, a MIPS processor, a Power PC processor or an ALPHA processor. In addition, the processor 101 may be any conventional special purpose processor such as a digital signal processor or a network communications protocol processor.

The device 100 includes a system controller 103 having an integrated RAM memory controller 104 connected to the host bus 102. The controller 103 provides an interface to random access memory 105. The system controller 103 also provides host bus to peripheral bus bridging functions. The controller 103 thereby permits signals on the processor host bus 102 to be compatibly exchanged with signals on a primary peripheral bus 110. The peripheral bus 110 may be for example a Peripheral Component Interconnect (PCI) bus, an Industry Standard Architecture (ISA) bus or Micro-Channel bus, or other bus structure. The device 100 may also include a first network adaptor 112 and a second network adaptor 114 coupled to the peripheral bus 110. The network adapters 112 and 114 may be for example, a modem, Ethernet card, or other network communications device. The device 100 may also include additional peripherals such as a hard disk drive control interface 111 to couple a hard disk 113 to the peripheral bus 110.

The device 100 includes non-volatile ROM memory 122 to store basic computer software routines. ROM 122 may include alterable memory, such as EEPROM (Electronically Erasable Programmable Read only Memory), to store configuration data. ROM 122 may include software to test and initialize device hardware and may include a device operating system, and application software. For example, in a bridge, the ROM 122 may include operating system software to control peripheral devices 111–112, 114 and may include network application software to perform transparent or source-routing bridging. In a device 100 implementation having a hard disk drive 113, the ROM may include "boot" routines to load operating system and application software from disk 113.

Figure 2A:
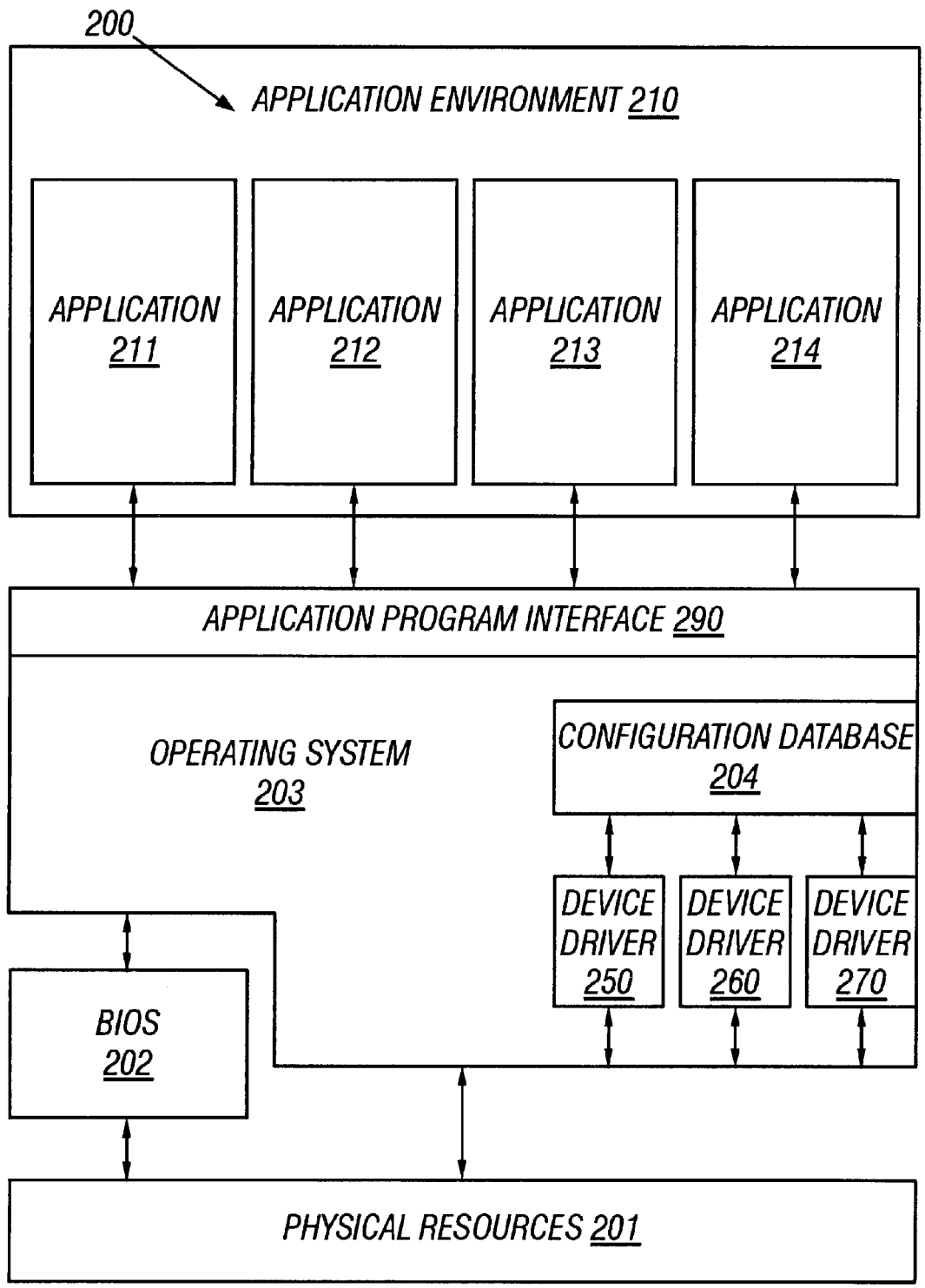
FIG. 2A illustrates a computer system operating environment.

Referring now to FIG. 2A, a computer system operating environment 200 is shown. The environment 200 includes software 202, 230, and 210 that can control and interact with physical resources 201. The physical resources 201 include for example, components 101–105, 110–114, and 120–126 of FIG. 1. Additionally, the environment 200 includes operating system software 230. The operating system 230 may be an operating systems such as Unix™ or may be a proprietary system. The operating system 230 provides software functions to manage, configure, enable, and allocate the various physical resources 201 in a computer.

For example, the operating system 230 may include memory allocation algorithms to allocate RAM memory 105 (FIG. 1) among various software tasks. Additionally, the environment 200 includes application program space 210. Application program space 210 includes memory and other physical resources allocated to application processes 211–214. The allocation of physical resources 201 to application processes 211–214 may be managed using operating system 230 functions.

To manage the physical resources 201, the operating system can include one or more device drivers 250–270. The device drivers provide control functionality specific to a particular physical device or class of devices. Additionally, the device drivers 250–270 provide standard software interfaces allowing other system 200 components to access the controlled device. For example, device driver 250 may be a network adapter driver. The adapter driver 250 provides standard software interfaces to, for example, the application program interface (API) 290. Applications 211–214, though use of application program interface 290 software functions, may thereby access the device driver 250 and network adapter 112 (FIG. 1). Device drivers 250–270 can also provide device-specific control, resource management, initialization, and fault handling for the controlled device.

Physical resources assignment by the operating system 203 may be determined by stored configuration data. The configuration data may determine what network interface devices are to be in operation, network protocols to be used, active features of the network, and network configuration. For example, a network device may receive configuration data transferred over a network using the Simple Network Management Protocol (SNMP). The type of configuration data that is transferred over the network depends on the type of network device used. For example, with an Asynchronous Transfer Mode (ATM) switch, the configuration information that is stored may include the name of the system, device identity and address information, information about permanent connections through the switch, the versions of the protocols to employ the various ports of the switch and the percentage of bandwidth to allocate for various traffic categories. In some network device systems, manually assigned system resources may need to be entered by the user into the operating system configuration database 240 to enable the operating system to function with peripherals. If these input values are incorrectly entered, system faults can occur. For example, a peripheral device may be unavailable to application programs or the computer system may fail to execute programs properly.

The operating system 230 establishes an application environment 210 in which applications 211–214 can execute. The applications 211–214 can implement network device operations such as routing, bridging and filtering. In various implementations, applications 211–214 may execute independently as separate task in a multiprocessing computer system and may occupy separate memory spaces. Applications 211–214 may require particular physical resources 201 to function. For example, a bridging or gateway application may require access to a pair of network adapters 112 and 114 (FIG. 1) so that a connection to a pair of networks can be established. The network adapters may be, for example, a token ring, Ethernet, ATM or other network access device. Applications 211–214 can obtain access to required resources using software function calls provided through the operating system's application program interface 290.

A network device may include flash memory to store device and application configuration data. Flash memory is a type of alterable non-volatile memory. Exemplary of flash memory components include Intel StrataFlash DA28F640J5-150 Flash Memory and Advanced Micro Devices AM 28 F020-200JC Flash Memory. In conventional flash memory implementations, it is possible to change individual bit locations from a "1" state value to a "0" state value. However, changing bit locations from a "0" state to a "1" state may require an entire flash memory block to be reset, destroying all data in it. These limitations may make it advantageous to store a new configuration as a set of records that are sequentially appended to an end of an existing configuration. Each record typically contains additions or modifications to preceding configuration records.

Referring now to FIG. 2B to aid embedded device reconfiguration, the device may provide a region of memory containing configuration records 203–209. Configuration records 203–209 are read by an initialization routine 202 to configure physical resources 201 and applications 210.

Configuration records 203–209 may be assigned values to establish "test" sections in the configuration data or records 203–209. When the system encounters a test section during start-up, it will use the configuration data stored in the test section to configure the system. Unless the user explicitly accepts the new (test) configuration, the old (non-test) configuration from another configuration record in the memory region will be reused the next time the system restarts.

Referring now to FIG. 2C, a configuration record is shown. Device and application configuration data may be stored in flash memory as a sequence of records. The sequence may include configurations records that hold configuration data and "Escape Records" 280 that indicate whether particular configuration record data has been used before, is to be tested, is to be accepted or rejected. A record may contain the following fields: Opcode 282, Length 281, Table ID 283, Record ID 284, Instance 285, and Data 286. Opcode field 282 contain data that indicates the type of information stored in the configuration record. For example, the Opcode 282 may indicate that a record is an escape record or that the record contains a piece of configuration information such as data for a connection through a switch. Length 281 is the length of a configuration record. The length information indicates where the following record in the sequence starts. A configuration record may also include a "Table ID" field 283, a "Record ID" field 284, and an "Instance" field 285. The Table ID, Record ID and Instance fields may be used by the device initialization and configuration routines to identify the configuration data being altered or established. The "Data" field 286 contains the configuration data. In an escape record, the "Record ID" field 284 may hold the escape record type. In some circumstances, another field Checksum may be used in order to check that a record has not changed because of a fault in the equipment.

The start of a test section may be marked by an escape record containing a state value in its Record ID field. The state value indicates whether the configuration data following the escape record is to be used in the device configuration. The escape value may contain one the following values:

| Binary Value | Meaning |
|---|---|
| 0000 0111 | Start Temporary |
| 0000 0101 | Test Temporary |
| 0000 0100 | Accept |
| 0000 0001 | Abort |
| 0000 1000 | Abort End |

A Start Temporary value indicates that the sequence of configuration data records following the escape record is being used for a first time. When a start temporary value is encounted during configuration during a first time, this value is changed to the test temporary value.

The Test Temporary value is used to indicate that a section of configuration data is under test. When the device encounters a Start Temporary value, the device changes Start Temporary to Test Temporary prior to attempting a test data configuration. If the device fails, necessitating a reboot, the Test Temporary value will be present rather that Start Temporary. The presence of Test Temporary during device initialization indicates that an attempt to initialize with new configuration data failed and that the device needs to take corrective action (such as initializing with a previous configuration that is know to be operational). Test Temporary can be changed if the configuration is accepted, or will automatically be rejected by the device if the configuration data failed on a previous test (see below).

The Accept value indicates that an attempted configuration has been successful and that a particular sequence of configuration records has been accepted for use in the device. Once the Accept value has been associated with a sequence of configuration records, the data in those records will be used by the device, until it is aborted or other configuration data is accepted.

Abort value indicates that the device is to ignore the configuration data associate with the escape record having the abort value. A user may manually associate an Abort value with an escape record, or unabort value may automatically assigned to the escape record by the device if the Test Temporary value is encountered on a fresh boot.

An escape record having an abort end value may be stored at the end of a sequence of configuration records that have been aborted. All configuration records between an escape record having an Abort value and escape record having an Abort End is ignored.

Figure 3:
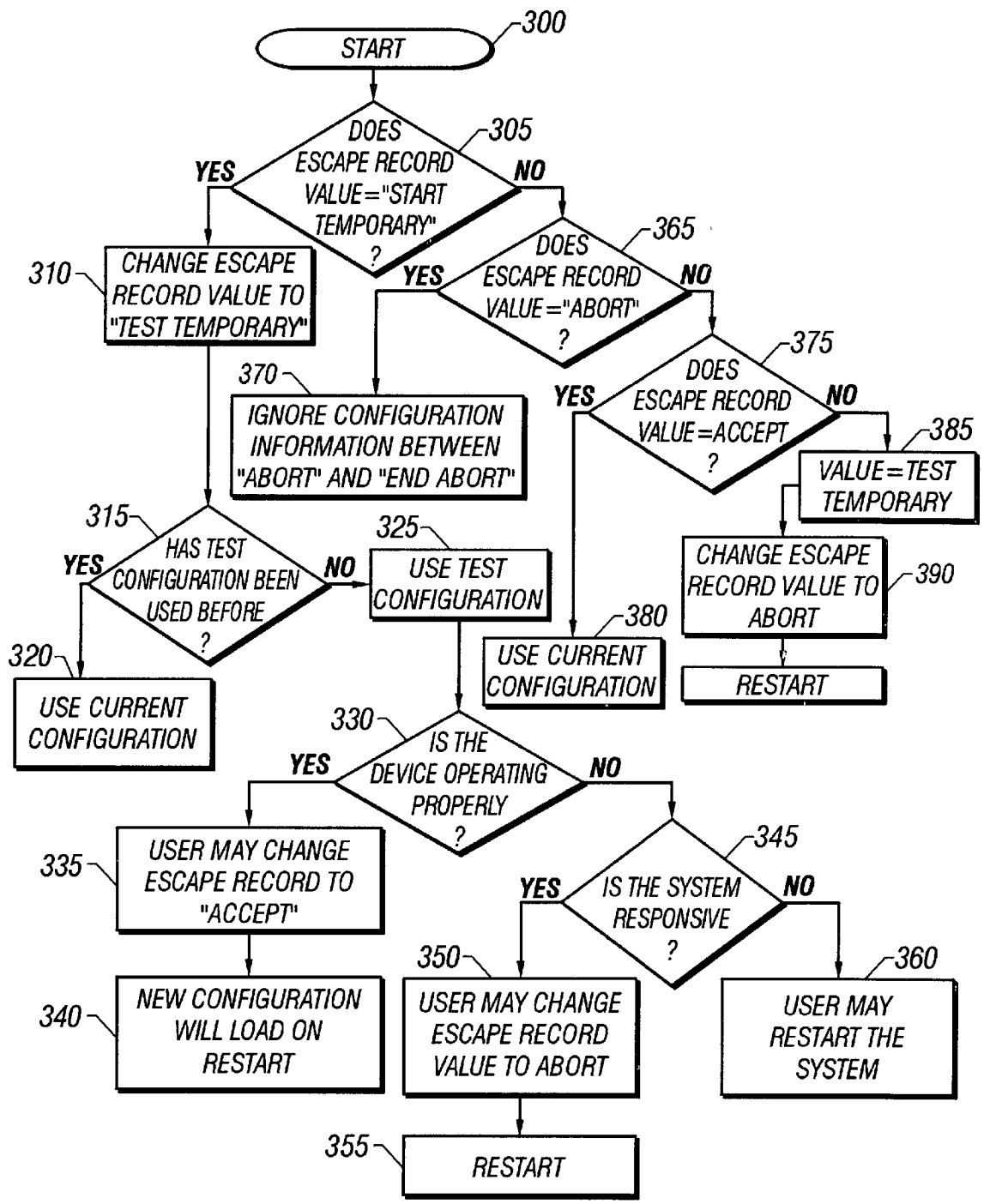
FIG. 3 is a flow chart depicting operations of the network system.

Shown in FIG. 3, is a flow chart showing processing of the Escape Record values upon a start or restart of the network device. The system may be started for the first time with a new configuration sequence, started with accepted configuration sequence or restarted due to a configuration sequence that did not work properly 300. When the system is started or restarted, it reads the entire configuration sequentially. If the configuration is new, the escape record will have previously been changed to "Start Temporary" 305. The system then changes the value to "Test Temporary" 310, by changing 1-bits to 0-bits, so that if the configuration does not function properly, the system can be restarted and "Test Temporary" will have its value changed (See below). If the same configuration has been used before the system will simply load that configuration 320. If the configuration has not been tested before, the test configuration is loaded 325.

If the system is operating properly 330, the user has the option to change the escape record value to "Accept" 335 so that on subsequent restarts that test configuration will be loaded 340. A change from "Start Temporary" to "Accept" is accomplished by changing selected 1-bits to 0-bits. By changing the escape record to "Accept", the configuration information following the "Accept" record is processed as normal configuration records and the test configuration is permanently enabled.

If the system is not operating properly 330, and the system is responsive to the user 345, then the user can change the escape record value to "Abort" 350. A new escape record value, "Abort End" is added at the end of the discarded test configuration. On a subsequent restart the system 355 ignores the configuration between "Abort" and "Abort End" (See Below). If the system is not responsive 345, the user simply restarts the system 360. Since, the escape record value is "Test Temporary", on a subsequent reboot, the system will change the value to "Abort" and ignore all configuration records between "Abort" and "Abort End" (See Below). Thus, the test configuration is not used anymore. Changing "Test Temporary" to "Abort" requires only changing a 1-bit to a 0-bit.

If the Escape record is not initially "Start Temporary" 305, then the system checks to see what other value is present. If the escape record value is "Abort" 365 then the system will ignore the configuration information between the values "Abort" and "End Abort" 370. This feature allows the system, on a previously failed configuration change, to have a non-functional configuration to be ignored. If the value is not "Abort" 365, it may be "Accept" 375. If so the system uses the configuration that it finds. This feature allows the user to have previously accepted a configuration that is functional. If the value is not "Accept" 375, then the last possibility is that the value is "Test Temporary" 385. This situation would have occurred if on a previous test configuration the system did not function correctly. At this time the system changes the escape record value to "Abort" 390 and places "Abort End" at the end of the non functional configuration. A new configuration can now be created.

If the system fails to function properly with the new configuration rendering the user interface inoperable or non-responsive. The user may then restart the system. When restarted, the system changes the "Test Temporary" escape record to "Abort" and adds a new escape record with the value "Abort End" to the end of the configurations records. The system will then ignore all configuration records between the "Abort" and the Abort End" record as previously described above in case Number 2. Thus, a test configuration which has been previously used and not explicitly accepted by the user (by changing the escape record value to "Accept") will be automatically discarded. An implementation of the invention therefore provides an automatic fall-back mechanism which re-establishes the old configuration in the event that the test configuration causes the system to mal-function or if the test configuration is not expressly accepted.

The invention may be implemented in digital circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at lease one programmable processor coupled to receive data and instructions from, and to transmit data and instructions to, a data storage system. At least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all form of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by or incorporated in, specially-designed ASICS (application-specific integrated circuits).

What is claimed is:

1. A computer implemented device configuration method, comprising:

storing a first sequence of configuration records, each configuration record comprising device configuration data;

storing an escape record, the escape record comprising data designating the first sequence as a test sequence; and establishing device configuration parameters in accordance with the configuration data in the test sequence.

2. The method of claim 1 wherein establishing device configuration parameters comprises:

altering escape record data to indicate an attempt to configure the device using configuration data in the test sequence; and setting a device parameter in accordance with configuration data in a first configuration record in the test sequence.

3. The method of claim 2 wherein the escape record is stored in a non-volatile memory, the non-volatile memory comprising a plurality of bit value locations, the bit value locations being independently addressable when changing state between a first state value and a second state value, and the bit value locations being addressable as members of a interdependent plurality of locations when changing state between the second state value and the first state value.

4. The method of claim 3 wherein altering escape record data comprises altering a bit value location between the first state value and the second state value.

5. The method of claim 2 further comprising reinitializing the device, wherein reinitializing the device comprises detecting an escape record designating the first sequence as a test sequence and altering the detected escape record to designate the first sequence as a rejected sequence.

6. The method of claim 2 further comprising:

establishing an operational device configuration;

receiving data indicating whether the operational device configuration is to be accepted or rejected; and selectively altering escape record data based on the received data to indicate whether the first sequence has been accepted or rejected.

7. The method of claim 6 wherein altering escape record data to indicate that the first sequence has been rejected further comprises storing a record designating the end of the first sequence.

8. A computer program residing on a computer-readable medium comprising instructions for causing a computer to:

store a first sequence of configuration records, each configuration record comprising device configuration data;

store an escape record, the escape record comprising data designating the first sequence as a test sequence; and establish device configuration parameters in accordance with the configuration data in the test sequence.

9. The computer program of claim 8 wherein the instructions to establish device configuration parameters comprises instructions to:

alter escape record data to indicate an attempt to configure the device using configuration data in the test sequence; and set a device parameter in accordance with configuration data in a first configuration record in the test sequence.

10. The computer program of claim 8 further comprising instructions to reinitialize the device, wherein the instructions to reinitialize the device comprises instructions to detect an escape record designating the first sequence as a test sequence and instructions to alter the detected escape record to designate the first sequence as a rejected sequence.

11. The computer program of claim 9 further comprising instructions to:

establish an operational device configuration;

receive data indicating whether the operational device configuration is to be accepted or rejected; and selectively alter escape record data based on the received data to indicate whether the first sequence has been accepted or rejected.

12. The computer program of claim 11 wherein instructions to selectively alter escape record data to indicate that the first sequence has been rejected further comprises instructions to store a record designating the end of the first sequence.

13. A processor-based apparatus comprising:

a processor;

a configurable peripheral device operationally coupled to the processor;

a memory operationally coupled to the processor, the memory storing instructions causing the processor to:

store a first sequence of configuration records in a second memory, each configuration record comprising device configuration data;

store an escape record in the second memory, the escape record comprising data designating the first sequence as a test sequence;

configure the peripheral device in accordance with the configuration data in the test sequence.

14. The apparatus of claim 13 wherein the memory is a hard disk.

15. The apparatus of claim 13 wherein the second memory is flash-memory.

* * * * *